United States Patent [19]

Rogers

[11] 4,392,710

[45] Jul. 12, 1983

[54] OPTICAL APPARATUS

[75] Inventor: Philip J. Rogers, Clwyd, Wales

[73] Assignee: Pilkington P. E. Limited, England

[21] Appl. No.: 204,160

[22] Filed: Nov. 5, 1980

[30] Foreign Application Priority Data

Nov. 22, 1979 [GB] United Kingdom ............... 7940482

[51] Int. Cl.³ .......................................... G02B 23/02
[52] U.S. Cl. .................................. 350/505; 350/444; 350/545
[58] Field of Search ....................... 350/27, 29, 33, 35, 350/55, 442, 444, 145, 146

[56] References Cited

FOREIGN PATENT DOCUMENTS

| | | |
|---|---|---|
| 720815 | 5/1942 | Fed. Rep. of Germany ...... 350/444 |
| 923925 | 4/1963 | United Kingdom . |
| 928215 | 6/1963 | United Kingdom .................. 350/35 |
| 1076639 | 7/1967 | United Kingdom . |
| 1389564 | 4/1975 | United Kingdom . |
| 1433333 | 4/1976 | United Kingdom . |
| 1506614 | 4/1978 | United Kingdom . |
| 1537276 | 12/1978 | United Kingdom . |
| 1542124 | 3/1979 | United Kingdom . |
| 1556511 | 11/1979 | United Kingdom . |
| 2020943 | 11/1979 | United Kingdom . |

Primary Examiner—John K. Corbin
Assistant Examiner—Matthew W. Koren
Attorney, Agent, or Firm—F. Eugene Davis, IV

[57] ABSTRACT

Optical apparatus for biocular viewing of relatively low cost and light weight comprises a solid Cassegrain configuration in a solid meniscus element having a negative lens element cemented to its convex face and an associated corrector lens element which provide a magnified collimated image of an object for viewing by a pair of telescopes having light folding means to provide an exit pupil separation suitable for two eye viewing. At least some of the lens elements may be of plastics material and aspheric surfaces may be employed. The apparatus is particularly useful for night vision goggles having a single image intensifier tube.

32 Claims, 3 Drawing Figures

OPTICAL APPARATUS

BACKGROUND OF THE INVENTION

This invention concerns improvements in or relating to optical apparatus and relates more particularly to optical apparatus for biocular viewing.

Optical apparatus for biocular viewing is used, for example, in low light level or night vision equipment by which an observer can view with both eyes a magnified image of an object which is usually the face-plate of an image intensifier tube. Light from a scene or object at a low brightness level is focussed by an objective lens system on to the image intensifier tube which, by an amplifying electro-optic system, displays on its face-plate an image of the scene or object of sufficient brightness for viewing by a human observer. Light from the displayed image travels via some form of magnifier to the observer's two eyes. In some applications of biocular viewing apparatus the object can be, instead of an image intensifier tube, a cathode ray tube.

Biocular apparatus which provides both eyes with a view of a single image intensifier or cathode ray tube had distinct cost and weight advantages over binocular apparatus in which two separate tubes and associated optics are provided, one for each eye. However, in biocular apparatus the optics have to meet the requirement of providing satisfactory imagery for the two spaced eye positions from a single object.

Two eye vision of a single object can be achieved by the use of a biocular magnifying lens, i.e. a lens specially designed to have an exit pupil sufficiently large for use with both eyes, and examples of such lenses are described in British Pat. Nos. 1,389,564 and 1,537,276. It has also been proposed in British patent specification No. 1,433,333 to cement the object to a solid body having planar and concave reflecting surfaces which form a final image at infinity, the extent and/or disposition of the reflecting surfaces and the extent of the solid medium being sufficient to permit biocular viewing of the final image by an observer having his eyes respectively before eye windows or output faces of the solid body. There have also been proposals for the use of a collimating lens system plus means for providing each eye with vision through a portion of the collimator aperture. In particular British patent specifications Nos. 1,506,614 and 1,556,511 effectively describes multi-reflection pupil expansion, British patent specification No. 1,542,124 describes a prism arrangement, British patent specifications No. 1,076,639 and GB 2020943A describes pupil transfer by telescopic means, and British patent specificaion No. 923,925 describes an arrangement with telescopes and prisms.

It is sometimes highly desirable that the biocular viewing apparatus should be mounted actually on the observer's head in the manner of goggles. This has the advantage relative to a fixed mounting of permitting head movement while maintaining a view through the apparatus and relative to hand holding of leaving the observer's hands free to perform other functions. Necessary requirements for head mounting are small size and low weight. These same requirements are, however, also desirable for modes other than head mounting, especially for man portable equipments.

The advent of relatively small and lightweight image intensifier and cathode ray tubes has greatly assisted in reducing the size and weight of the equipment and reasonable portability and even head mounting has been achieved. Nevertheless, there is a continuing demand for reduction in size and weight allied with a desire for low cost while, of course, maintaining adequate optical performance.

SUMMARY OF THE INVENTION

Broadly according to the present invention there is provided optical apparatus for providing both eyes of an observer with a view of a single object comprising a catadioptric lens system, and a pair of telescopes for viewing the image produced by that system, there being means to fold the light path through each telescope so as to provide an exit pupil separation that is adequate for normal two eye viewing. The catadioptric system may consist of only two or three lens elements. In particular it may consist of a solid meniscus element having a concave face of shorter radius of curvature than its convex face and having a reflective coating applied to the central area of the externally concave face to provide an internally convex reflecting area, and a reflective coating applied to the outer part of the externally convex face to provide internally concave reflecting areas, thereby forming a solid Cassegrain configuration in the body of the element, a negative lens element cemented to the central area of said externally convex face, and a correcting lens element disposed to receive light emerging from said solid meniscus element. In an alternative arrangement said solid meniscus element and said negative lens element may be combined as a unitary single element consisting basically of the meniscus element shape with a part corresponding and equivalent to the negative lens element projecting from the central area of its externally convex face, the reflective coating applied to the latter being outwardly of said projecting part. Such unitary single element may be produced for example by moulding. The telescopes may be of simple form each comprising a single or double lens element objective and a single or double lens element eye-piece. Some or all of the lens elements may be made of optical plastics material and aspheric surfaces may be employed. Alternatively the lens elements may all be of glass employing only surfaces of spherical curvature. Preferably the catadioptric lens system is a collimating system which produces a collimated image of the object, and the means to fold the light path through the telescopes and the telescope eye-pieces may be so angled that the lines of sight from the two eyes converge to locate the image viewed by the observer at a convenient distance in front of him. alternatively, however, the catadioptric lens system may effectively be a defocussed collimator, i.e. may form a virtual image of the object at a finite distance and the telescopes may be angled to diverge accordingly towards the eye positions.

Further according to the invention there is provided optical apparatus for biocular viewing comprising a solid optical element having an internally convex reflecting surface area which internally reflects light received from an object to be viewed, said solid optical element further having internally concave reflecting surface areas which internally reflect light received from said internally convex reflecting surface area, the light then emerging from said solid optical element to each side of said internally convex reflecting surface area, a correcting lens element which transmits and refracts the emergent light, the solid optical element and the correcting lens element thus producing an image of the object, and a pair of telescopes, for viewing that image, each telescope comprising an objective lens and an eye-piece lens, and light path folding means between the objective lens and the eye-piece lens such that the exit pupil separation between the two telescopes is appropriate for two eye viewing, whereby an observer viewing with one eye through one and the other eye through the other telescope can see with each eye a magnified image of the object.

The light travelling from the correcting lens element may be collimated light and the light path folding means and the eye-piece lenses may be angled so that the lines of sight from the two eyes converge to locate the image viewed by the observer at a convenient distance in front of him. Alternatively the light travelling from the correcting lens element may be divergent light and the telescopes may be angled to diverge accordingly so that the image viewed by the observer is at a convenient distance in front of him.

Said solid optical element may comprise a meniscus element having said reflecting surface areas and a negative lens element cemented to the externally convex face of the meniscus element. Preferably, but not essentially, said negative lens element is of the same or a similar material to said meniscus element, which is preferably made of glass. Alternatively said solid optical element may be a unitary, e.g. moulded, element of meniscus shape with a part projecting from its externally convex face.

Said correcting lens element is preferably meniscus in shape concave towards the object, and may be made of glass and have refracting surfaces of spherical curvature, or may be made of a plastics material and have an aspheric refracting surface.

The objective and eye-piece lenses of each telescope may be made of glass or may be made of a plastics material. When of glass, the objective lens may consist of one or two lens elements and the eye-piece lens may consist of two, possibly identical, lens elements, and the glass curved refracting surfaces may all be of spherical curvature. When of plastics material, the objective lens may consist of a single lens element which may have an aspheric refracting surface, and the eye-piece lens may consist of a single lens element which may have an aspheric refracting surface.

The light path following means between the objective lens and the eye-piece lens in each telescope preferably comprises a pair of mirrors, although a prism could be employed.

The present invention further provides night vision goggles having a single image intensifier tube and optical apparatus as set forth above for providing each eye of an observer with an image of visual information displayed on the image intensifier tube.

BRIEF DESCRIPTION OF THE DRAWINGS

Optical apparatus in accordance with the invention will now be described, by way of example, with reference to the accompanying drawings, in which.

DESCRIPTION OF THE PREFERRED EMBODIMENTS

Figure 1:
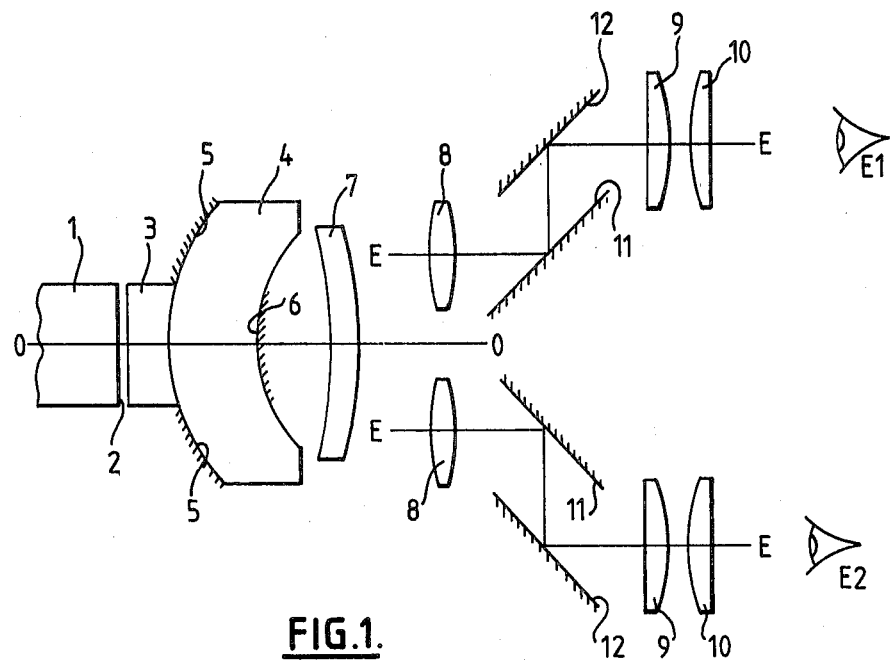
FIG. 1 is a schematic representation of a first embodiment.

The embodiment shown in FIG. 1 comprises an object in the form of an image intensifier tube 1 having a face-plate 2 on which visual information is displayed in known manner. Close to the face-plate 2 is a plano concave element 3 whose concave face matches and is cemented to the central portion of the convex face of a solid meniscus optical element 4. The outer portion of the convex face of the element 4 has a reflective coating to provide internally concave reflecting areas 5, and the central portion of the concave face of the element 4 has a reflective coating to provide an internally convex reflecting area 6. The element 4, which is essentially a simple meniscus lens element whose concave face has a radius shorter than that of its convex face, thus forms a solid Cassegrain configuration in the body of the lens element. Near to the externally concave face of the element 4 is a weak positive meniscus lens element 7 concave towards the object.

The element 4 is formed of a low dispersion optical material and the negative lens element 3 is of the same or a similar material (although similarity of material is not essential). The weak positive lens element 7 on the opposite side of the solid Cassegrain element 4 to the object is of a highly dispersive optical material.

The elements 3, 4 and 7 together provide a collimating system for producing a magnified collimated image of visual information displayed on the face-plate 2 of the image intensifier tube 1. Light from the faceplate 2 is transmitted through the element 3 and enters the element 4 to be reflected from the internally convex reflecting area 6 and then from the internally concave reflecting areas 5. The light so reflected then emerges through the clear outer portion of the externally concave face of the element 4. Thus, as viewed in FIG. 1, the light emerges through the externally concave face of the element 4 effectively as two beams one to each side of the coated central area 6. There is some refraction at this face and the beams are further refracted as they pass through the positive lens element 7.

The high level of undercorrect spherical aberration produced by the internally concave reflecting surface areas 5 is largely corrected by the aggregate of the overcorrect spherical aberration produced by the internally convex reflecting surface area 6 and the refracting externally concave output face of the solid Cassegrain element 4. The overcorrect longitudinal chromatic aberration of the solid Cassegrain element 4 is corrected by the positive lens element 7. Coma and astigmatism are both essentially low due to the approximate concentricity of all the optical surfaces of the solid Cassegrain element 4 (excepting the planar surface of the element 3 near the object) with the aperture stop (assumed to be at the output surface of the positive lens 7): the positive lens 7 gives low contributions due to its low optical power. Field curvature is not fully corrected but is sufficiently low that a collimation accuracy of the order of 2 milliradians can be achieved at the edge of a 27 degree field of view.

The solid Cassegrain element 4 is preferably fabricated of glass owing to the relatively high surface accuracies required at the reflecting surfaces. However, it may be fabricated of a low dispersion optical plastics material such as acrylic material, for example that know under the trade name Perspex, in which case the elements 3 and 4 may be moulded as one unit. The weak positive lens element 7 may be made of a flint glass type or of a highly dispersive optical plastics material such as polystyrene. In the latter case an aspheric surface may be used in order to achieve a more comprehensive correction of spherical aberration.

The magnified collimated image produced by the collimating system described above is viewed by a pair of low magnification (typically ×1.3 although lower or higher magnification than this may be employed) telescopes. Thus each of the previously mentioned collimated light beams emerging from the collimating system is received by a respective telescope, the telescopes effectively looking through the clear and hence unobscured area to either side of the coated and obscured central area 6 of the element 4. The solid Cassegrain element 4 may be truncated to remove unused parts and reduce weight. The telescopes may be essentially conventional in form, being fabricated of glass and being fully achromatised and also having a well corrected multi-element eyepiece. However, in order to reduce cost, a simpler form of telescope may be employed, alternatives being a simple glass construction or a system fabricated entirely of optical plastics material.

With a simple glass construction, cost may be reduced by employing a single lens element objective and a two-element eyepiece (preferably of two identical lens elements). Such an arrangement is shown in FIG. 1 in which the single element objective is a bi-convex element 8 and the eye-piece consists of two identical plano-convex elements 9 and 10 disposed with their convex faces towards and spaced from one another. In the telescope system there is a central air-space between the objective and the eye-piece sufficient to accommodate two folding mirrors 11 and 12 which provide an exit pupil separation that is adequate for normal two eye viewing, the width or effective diameter of the element 4 being less than the eye separation. Thus in each of the two telescopes, light from the objective lens 8 (which focusses the light to form an intermediate image) is reflected firstly from the mirror 11 and then from the mirror 12 to the eye-piece 9/10 (which views the intermediate image).

An observer with his eyes located at eye positions E1 and E2 views through the eye-pieces and thus sees with each eye a magnified image of the visual information displayed on the face-plate 2 of the image intensifier tube 1. The mirrors 11 and 12 and the eye-pieces may be angled so that the lines of sight from the respective eye positions E1 and E2 converge to locate the image viewed by the observer at a convenient distance in front of him.

In each telescope of the system shown in FIG. 1 the objective lens element 8 is preferably made of a high refractive index flint glass and spaced away from the solid catadioptric arrangement such that the high index reduces its undercorrect spherical aberration and its spacing means that its astigmatism is low and its lateral chromatic aberration cancels that introduced by the unachromatised eye-piece system. Longitudinal chromatic aberration is not corrected but is sufficiently low to be tolerable over the typical spectral bandwidth defined by a green phosphor as commonly used in the image intensifier tube 1. The shape chosen for the glass objective lens 8 is that which gives low coma for the whole glass telescope system.

The eye-piece lens elements 9 and 10 are made of a low dispersion glass and preferably shaped to reduce distortion and pupil spherical aberration to a minimum. Any residual distortion can be compensated in the design of the objective lens (not shown) at the front end of the overall system which focusses light from a scene or object at low light level on to the image intensifier tube 1.

A particular example of system in accordance with the FIG. 1 embodiment has numerical data as follows, the dimensional-units being millimeters. In this example all the optical elements 3, 4, 7, 8, 9 and 10 are of glass and their successive faces in the direction of light travel are indicated as R1 to R13. Thus R1 is the front planar face of the element 3 and R13 is the back planar face of the element 10. The externally convex (internally concave) face of the element 4 is represented by both R2 and R4 since light is incident on this face twice, firstly as it enters the element 4 through the central portion of this face (which is cemented to and matches the concave face of the element 3) and secondly as it is internally reflected from the outer reflecting areas 5. Similarly the externally concave (internally convex) face of the element 4 is represented by both R3 and R5 since light is also incident on this face twice, firstly as it is internally reflected from the reflective central area 6 of this face and secondly as it is transmitted through the face on either side of the central area 6. All the curved faces have spherical curvature. The axial thickness/separation figures are in respect of surfaces R1 to R7 (elements 3, 4 and 7) along the central axis 0, and in respect of surfaces R8 to R13 (elements 8, 9 and 10) along the optical axis E to the respective eye position. The separation between surfaces R7 and R8 is on the axis 0 and is the distance between the point where surface R7 cuts the axis 0 and the point where a tangent to surface R8 cuts the axis 0 orthogonally. This example is referred to later as Example 1.

| Surface | Radius of Curvature | Axial Thickness/ Separation | Refractive Index Nd | Constringence V |
|---|---|---|---|---|
| R1 | PLANO | | | |
| | | 7.0 | 1.62041 | 60.33 |
| R2 | 32.5 | | | |
| | | 14.2 | 1.62041 | 60.33 |
| R3 | 26.0 | | | |
| | | −14.2 | 1.62041 | 60.33 |
| R4 | 32.5 | | | |
| | | 14.2 | 1.62041 | 60.33 |
| R5 | 26.0 | | | |
| | | 12.1 | | |
| R6 | −101.4 | | | |
| | | 4.4 | 1.78472 | 25.76 |
| R7 | −82.7 | | | |
| | | 12.4 | | |
| R8 | 58.3 | | | |
| | | 3.3 | 1.78472 | 25.76 |
| R9 | −40.2 | | | |
| | | 48.2 | | |
| R10 | PLANO | | | |
| | | 3.7 | 1.68900 | 49.48 |
| R11 | −30.5 | | | |
| | | 3.0 | | |
| R12 | 30.5 | | | |
| | | 3.7 | 1.68900 | 49.48 |
| R13 | PLANO | | | |

Figure 2:
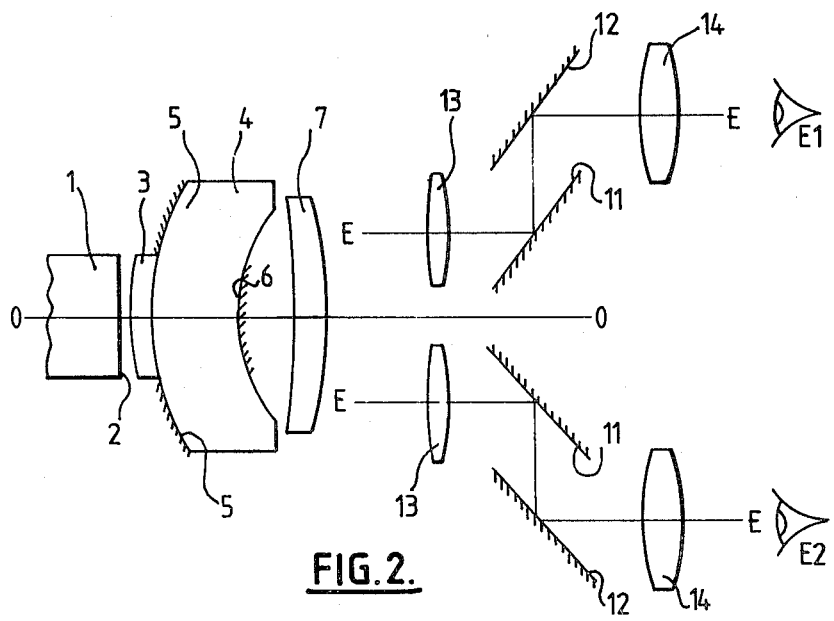
FIG. 2 is a schematic representation of a second embodiment.

The embodiment shown in FIG. 2 is basically similar to that shown in FIG. 1 but employs elements of plastics material for the telescopes. In the FIG. 2 embodiment each telescope consists of a single lens element objective 13 and a single lens element eye-piece 14 (their being folding mirrors 11 and 12 as previously described in the light path between the objective and the eyepiece). The objective lens element 13 and the eye-piece lens element 14 each have one aspheric surface in order to correct spherical aberration, coma, astigmatism, distortion and pupil spherical aberration. As in the case of the glass telescope, the objective lens element is preferably made of a high dispersion material, and as a specific example polystyrene, and spaced from the solid catadioptric in order to correct lateral chromatic aberration. The eye-piece lens element 14 is made of a low dispersion material, and in particular acrylic material such as that known under the trade name Perspex. Preferably a glass plate or lens (not shown) is placed between the eye-piece lens and the eye position to provide protection against scratching. In the FIG. 2 embodiment the weak positive lens element 7 is also made of a high dispersion plastics material such as polystyrene and also has one aspheric surface. The elements 3 and 4 are made of glass and the front surface of element 3 is convex so that the element 3 is meniscus in shape.

A particular example in accordance with the FIG. 2 embodiment has numerical data as follows, the dimensional units again being millimeters. The successive surfaces are indicated as R1 to R11 in the same fashion as in Example 1, but there are two less surfaces since the eye-piece consists of a single element. This example is referred to later as Example 2.

| Surface | Radius of Curvature | Axial Thickness/ Separation | Refractive Index Nd | Constringence V |
|---|---|---|---|---|
| R1 | 61.7 | | | |
| | | 3.2 | 1.51680 | 64.17 |
| R2 | 37.8 | | | |
| | | 14.4 | 1.51680 | 64.17 |
| R3 | 27.8 | | | |
| | | −14.4 | 1.51680 | 64.17 |
| R4 | 37.8 | | | |
| | | 14.4 | 1.51680 | 64.17 |
| R5 | 27.8 | | | |
| | | 9.7 | | |
| R6 | −157.7 | | | |
| | | 5.2 | 1.59184 | 30.89 |
| R7 | aspheric | | | |
| | | 16.3 | | |
| R8 | aspheric | | | |
| | | 3.8 | 1.59184 | 30.89 |
| R9 | −32.1 | | | |
| | | 51.5 | | |
| R10 | 23.1 | | | |
| | | 7.6 | 1.49033 | 58.23 |
| R11 | aspheric | | | |

Aspheric surfaces R7, R8 and R11 are defined respectively by the following equations:

$$R7: -z = \frac{0.0125S^2}{1 + \sqrt{1 - 0.00014S^2}} - 0.71 \times 10^{-6} \cdot S^4 - 0.45 \times 10^{-8} \cdot S^6 + 0.88 \times 10^{-11} \cdot S^8$$

$$R8: -z = \frac{0.023S^2}{1 + \sqrt{1 + 0.0017S^2}} - 0.50 \times 10^{-6} \cdot S^4$$

$$R11: -z = \frac{0.047S^2}{1 + \sqrt{1 + 0.0058S^2}} - 0.93 \times 10^{-5} \cdot S^4$$

$$S^2 = x^2 + y^2$$

where x, y and z are mutually orthogonal co-ordinates of which z is along the optical axis.

It will be seen that apparatus as described above can be of relatively low cost and light weight and is particularly suitable for use in night vision goggles. Typically the entire viewing system can provide a Field of View of 40 degrees, an Eye Pupil Diameter of 6 mm, an Eye Relief of 26 mm, a Resolution of 1 milliradian, and a Field Curvature of $2\frac{1}{2}$ dioptres. The weight of the elements 3, 4, 7, 8, 9 and 10 in an all glass system as in Example 1 can total about 100 gm, and of the elements 3, 4, 7, 13 and 14 in a glass/plastic system as in Example 2 about 45 gm. It will further be noted that the viewing system avoids the need for an inverting stage in the image intensifier tube 1 as inversion is provided by the viewing system.

In the embodiments as specifically described above the elements 3, 4 and 7 provide a catadioptric system which collimates light from the object to produce a collimated image for viewing by the telescopes. As previously mentioned the folding mirrors and eye-pieces of the telescopes may be so angled as to locate the image viewed by the observer at a convenient distance in front of him. As an alternative, the catadioptric lens system may be arranged to produce divergent light apparently coming from a position say 70 cm beyond the system, i.e. the catadioptric lens system may effectively be a de-focussed collimator which produces a virtual image of the object at that position. The telescopes can then be angled accordingly, i.e. their axes E can diverge towards the eye positions so that they converge towards that image position.

The embodiments specifically described and exemplified above are suitable for use with an image intensifier tube phosphor having an appreciable spectral bandwidth of say 100 nanometers such as occurs with green phosphors commonly used in image intensifier tubes. Thus the solid Cassegrain element 4, and possibly the negative element 3, and the telescope eye-piece elements 9 and 10 or 14 are of a low dispersion material having for example a constringence or V value of not less than 40 while the telescope objective elements 8 or 13 are of a relatively high dispersion material having for example a constringence or V value not more than 40 and also having a relatively high refractive index Nd for example not less than 1.58. Further, the lens element 7 described above as weakly positive but which is essentially a correcting lens element, is of a highly dispersive material having for example a constringence of V value not more than 35. It will be appreciated that if a monochrome phosphor is employed, then the need for colour correction is reduced and these dispersion and refractive index considerations are of less significance. Thus a greater freedom of choice of materials is possible since the indicated low and high dispersions and high refractive index can be unnecessary. Further, the correcting lens element 7 need not be weakly positive but could be of zero or weakly negative power.

Figure 3:
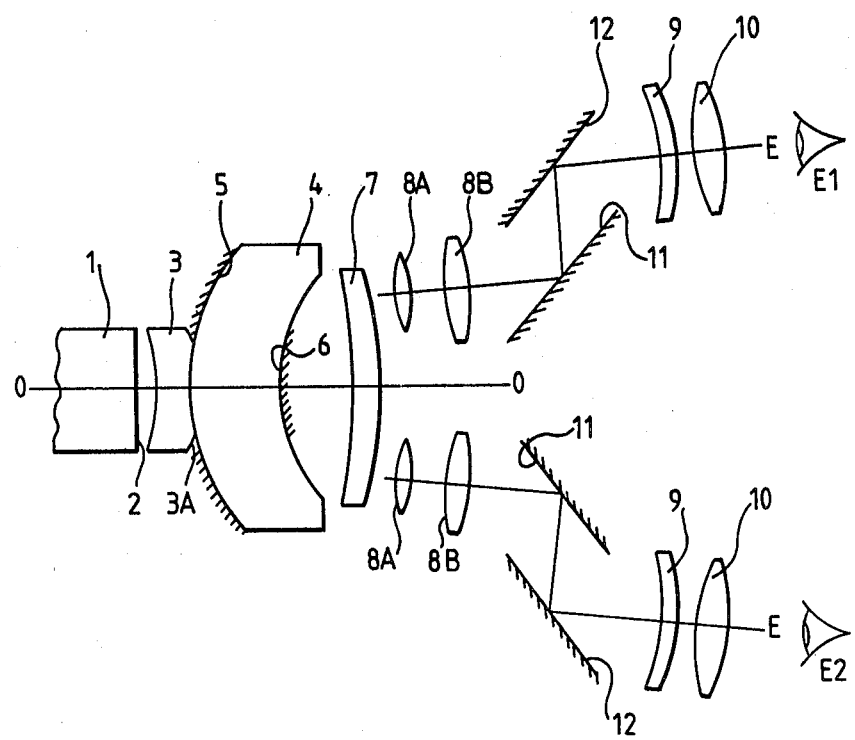
FIG. 3 is a schematic representation of a third embodiment.

A further embodiment is shown in FIG. 3. This is basically similar to that of FIG. 1 and the same references are used to indicate like parts. However, in the FIG. 3 embodiment the objective lens of each telescope consists of two bi-convex lens elements indicated as 8A and 8B, the element 8B further from the element 7 being of a highly dispersive material and the element 8A near the element 7 being of a relatively low dispersive material. Such two element objective enables, by reducing spherical aberration, an increase in telescope aperture and hence exit pupil to be achieved. The elements 9 and 10 forming the eyepiece lens of each telescope are respectively meniscus and bi-convex. The negative element 3 cemented to element 4 is bi-concave, the front surface being made concave for field curvature and spherical aberration purposes. The element 3 also has anti-ghosting chamfers 3A.

A particular example in accordance with the FIG. 3 embodiment has numerical data as follows, the dimensional units again being millimeters. All the optical elements 3, 4, 7, 8A, 8B, 9 and 10 are of glass and their successive faces in the direction of light travel are indicated as R1 to R15 in similar fashion to Example 1 (there being two additional faces because of the two element objective). All these faces are of spherical curvature. This example is referred to as Example 3.

In this Example 3 the object is at an axial distance of 0.59 mm from the first surface R1 and the optical system formed by elements 3, 4 and 7 forms an image of the object at a distance of −249.6 mm from the surface R7 (i.e. this system acts as a de-focussed collimator as previously mentioned). The telescopes are angled, i.e. diverge towards the eye positions, to view this image, the final image being located −399.6 mm from surface R15. The eye relief from surface R15 is 29.5 mm and the exit pupil diameter is 7.0 mm.

| Surface | Radius of Curvature | Axial Thickness/ Separation | Refractive Index Nd | Constringence V | Diameter |
|---|---|---|---|---|---|
| R1 | −155.803 | | | | 17.2 |
| | | 8.17 | 1.60738 | 56.65 | |
| R2 | +36.919 | | | | 15.2 |
| | | 11.46 | 1.60738 | 56.65 | |
| R3 | +32.446 | | | | 17.7 |
| | | −11.46 | 1.60738 | 56.65 | |
| R4 | +36.919 | | | | 37.7 |
| | | 11.46 | 1.60738 | 56.65 | |
| R5 | +32.446 | | | | 34.5 |
| | | 7.20 | | | |
| R6 | −95.010 | | | | 34.7 |
| | | 3.30 | 1.78472 | 25.75 | |
| R7 | −63.027 | | | | 35.5 |
| | | 2.00 | | | |
| R8 | +155.803 | | | | 8.3 |
| | | 2.35 | 1.51680 | 64.17 | |
| R9 | −155.803 | | | | 9.2 |
| | | 16.00 | | | |
| R10 | 55.724 | | | | 18.6 |
| | | 2.90 | 1.78472 | 25.75 | |
| R11 | −55.724 | | | | 18.8 |
| | | 53.768 | | | |
| R12 | −155.803 | | | | 27.0 |
| | | 4.20 | 1.68900 | 49.47 | |
| R13 | −29.310 | | | | 27.3 |
| | | 0.50 | | | |
| R14 | +55.724 | | | | 25.9 |
| | | 3.60 | 1.68900 | 49.47 | |
| R15 | −155.803 | | | | 25.4 |

I claim:

1. Optical apparatus for providing both eyes of an observer with a view of a single object comprising a catadioptric lens system and a pair of telescopes for viewing the image produced by that system, each of said telescopes comprising optical elements spaced from each other and from the catadioptric lens system by a medium which is neither solid nor liquid, there being means to fold the light path through each telescope so as to provide an exit pupil separation that is adequate for normal two eye viewing.

2. Apparatus according to claim 1 in which the catadioptric system consists of no more than three lens elements.

3. Apparatus according to claim 2 in which the catadioptric system consists of a solid meniscus element having a concave face of shorter radius of curvature than its convex face and having a reflective coating applied to the central area of the externally concave face to provide an internally convex reflecting area, and a reflective coating applied to the outer part of the externallly convex face to provide internally concave reflecting areas, thereby forming a solid Cassegrain configuration in the body of the element, a negative lens element cemented to the central area of said externally convex face, and a correcting lens element disposed to receive light emerging from said solid meniscus element.

4. Apparatus according to claim 2 in which the catadioptric system consists of a solid unitary element basically of meniscus shape having a concave face of shorter radius of curvature than its convex face and having a part equivalent to a negative lens element projecting from the central area of its convex face, said unitary element having a reflective coating applied to the central area of the externally concave face to provide an internally convex reflecting area, and a reflective coating applied to the externally convex face outwardly of said projecting part to provide internally concave reflecting areas, thereby providing a solid Cassegrain configuration in the body of the element, and a correcting lens element disposed to receive light emerging from said solid unitary element.

5. Apparatus according to claim 1 in which each telescope comprises an objective comprising no more than two lens elements and an eye-piece comprising no more than two lens elements.

6. Apparatus according to claim 1 having at least some lens elements of optical plastics material.

7. Apparatus according to claim 6 employing aspheric surfaces.

8. Apparatus according to claim 1 in which all the lens elements are of glass employing only surfaces of spherical curvature.

9. Apparatus according to claim 1 in which the catadioptric lens system is a collimating system which produces a collimated image of the object.

10. Apparatus according to claim 9 in which the means to fold the light path through the telescopes and the telescope eye-pieces are so angled as to locate the image viewed by the observer at a convenient distance.

11. Apparatus according to claim 1 in which the catadioptric lens system is effectively a de-focussed collimator which forms a virtual image of the object at a finite distance.

12. Apparatus according to claim 11 in which the telescopes are angled to diverge towards the eye positions.

13. Optical apparatus for biocular viewing comprising a solid optical element having an internally convex reflecting surface area which internally reflects light received from an object to be viewed, said solid optical element further having internally concave reflecting surface areas which internally reflect light received from said internally convex reflecting surface area, the light then emerging from said solid optical element to each side of said internally convex reflecting surface area, a correcting lens element which transmits and refracts the emergent light, the solid optical element and the correcting lens element thus producing an image of the object, and a pair of telescopes, for viewing that image, each telescope comprising an objective lens spaced from said solid optical element and said correcting lens element by a medium which is neither solid nor liquid, and an eye-piece lens spaced from the objective lens by a medium which is neither solid nor liquid, and light path folding means between the objective lens and the eye-piece lens such that the exit pupil separation between the two telescopes is appropriate for two eye viewing, whereby an observer viewing with one eye through one and the other eye through the other telescope can see with each eye a magnified image of the object.

14. Apparatus according to claim 13 in which light travelling from the correcting lens element is collimated light and the light path folding means and the eye-piece lenses are angled so that the lines of sight from the two eyes converge to locate the image viewed by the observer at a convenient distance.

15. Apparatus according to claim 13 in which light travelling from the correcting lens element is divergent light and the telescopes are angled to diverge accordingly so that the image viewed by the observer is at a convenient distance.

16. Apparatus according to claim 13 in which said solid optical element comprises a meniscus element having said reflecting surface areas and a negative lens element cemented to the externally convex face of the meniscus element.

17. Apparatus according to claim 16 in which said negative lens element is of like material to said meniscus element.

18. Apparatus according to claim 16 in which said meniscus element is made of glass.

19. Apparatus according to claim 13 in which said solid optical element is a unitary element of meniscus shape with a part projecting from its externally convex face.

20. Apparatus according to claim 13 in which said correcting lens element is meniscus in shape concave towards the object.

21. Apparatus according to claim 20 in which said correcting lens element is made of glass and has refracting surfaces of spherical curvature.

22. Apparatus according to claim 20 in which said correcting lens element is made of a plastics material and has an aspheric refracting surface.

23. Apparatus according to claim 13 in which the objective and eye-piece lenses of each telescope are made of glass.

24. Apparatus according to claim 13 in which the objective and eye-piece lenses of each telescope are made of a plastics material.

25. Apparatus according to claim 23 in which in each telescope the objective lens consists of no more than two lens elements and the eye-piece lens consists of two lens elements.

26. Apparatus according to claim 25 in which the two lens elements of the eye-piece lens are identical.

27. Apparatus according to claim 23 in which the glass curved refracting surfaces of the telescopes are all of spherical curvature.

28. Apparatus according to claim 24 in which in each telescope the objective lens consists of a single lens element and the eye-piece lens consists of a single lens element.

29. Apparatus according to claim 28 in which the objective lens element in each telescope has an aspheric refracting surface.

30. Apparatus according to claim 28 in which the eye-piece lens element in each telescope has an aspheric refracting surface.

31. Apparatus according to claim 13 in which the light path folding means between the objective lens and the eye-piece lens in each telescope comprises a pair of mirrors.

32. Night vision goggles having a single image intensifier tube and optical apparatus according to claim 1 or claim 13 for providing each eye of an observer with an image of visual information displayed on the image intensifier tube.

* * * * *

UNITED STATES PATENT AND TRADEMARK OFFICE
CERTIFICATE OF CORRECTION

PATENT NO. : 4,392,710
DATED : July 12, 1983
INVENTOR(S) : Philip J. Rogers

It is certified that error appears in the above—identified patent and that said Letters Patent are hereby corrected as shown below:

Col. 2, line 50, delete "alternatively" and substitute therefor --Alternatively--.

Col. 3, line 48, delete "following" and substitute therefor --folding--.

Col. 4, line 66, delete "know" and substitute therefor --known--.

Col. 8, line 46, delete "constringence of" and substitute therefor --constringence or--.

Signed and Sealed this

Third Day of January, 1989

*Attest:*

DONALD J. QUIGG

*Attesting Officer*   *Commissioner of Patents and Trademarks*